United States Patent
Weh et al.

(10) Patent No.: US 12,103,507 B2
(45) Date of Patent: Oct. 1, 2024

(54) HYDRAULIC POWER UNIT FOR A HYDRAULIC VEHICLE BRAKING SYSTEM

(71) Applicant: Robert Bosch GmbH, Stuttgart (DE)

(72) Inventors: Andreas Weh, Sulzberg (DE); Harald Guggenmos, Immenstadt/Seifen (DE); Martin Hagspiel, Rettenberg (DE); Stefan Kaserer, Ofterschwang (DE)

(73) Assignee: Robert Bosch GmbH, Stuttgart (DE)

( * ) Notice: Subject to any disclaimer, the term of this patent is extended or adjusted under 35 U.S.C. 154(b) by 750 days.

(21) Appl. No.: 17/272,165

(22) PCT Filed: Sep. 18, 2019

(86) PCT No.: PCT/EP2019/075085
§ 371 (c)(1),
(2) Date: Feb. 26, 2021

(87) PCT Pub. No.: WO2020/069872
PCT Pub. Date: Apr. 9, 2020

(65) Prior Publication Data
US 2021/0206363 A1 Jul. 8, 2021

(30) Foreign Application Priority Data
Oct. 4, 2018 (DE) .................. 10 2018 216 976.4

(51) Int. Cl.
*B60T 13/74* (2006.01)
*B60T 17/08* (2006.01)

(52) U.S. Cl.
CPC ............ *B60T 13/745* (2013.01); *B60T 17/08* (2013.01)

(58) Field of Classification Search
CPC ...... B60T 8/368; B60T 8/4018; B60T 8/4022; B60T 8/4031; B60T 8/4081; B60T 8/343;
(Continued)

(56) References Cited

U.S. PATENT DOCUMENTS

2015/0375727 A1* 12/2015 Weh .................. F16H 57/00
29/428
2015/0377261 A1* 12/2015 Weh .................. F04B 9/02
92/33
(Continued)

FOREIGN PATENT DOCUMENTS

| CN | 2061227 U | 8/1990 |
|---|---|---|
| CN | 1152062 A | 6/1997 |

(Continued)

OTHER PUBLICATIONS

International Search Report for PCT/EP2019/075085, Issued Jan. 14, 2020.

*Primary Examiner* — Robert A. Siconolfi
*Assistant Examiner* — San M Aung
(74) *Attorney, Agent, or Firm* — NORTON ROSE FULBRIGHT US LLP; Gerard A. Messina

(57) ABSTRACT

A piston of a hydraulic power unit of a hydraulic power vehicle braking system including slip control is guided directly, without a cylinder liner, in a cylinder bore of a hydraulic block. The piston is rotatably fixedly and axially displaceably held in a bushing with the aid of an anti-rotation mechanism, which in turn is rotatably fixed at the hydraulic block. A pivot bearing of a worm gear for displacing the piston is fixed at the bushing.

18 Claims, 1 Drawing Sheet

(58) Field of Classification Search
CPC ........ B60T 13/14; B60T 13/16; B60T 13/745; B60T 13/746; B60T 13/161; B60T 13/148; B60T 13/686; B60T 17/02; B60T 17/08; B60Y 2400/73; B60Y 2400/81; F04B 9/02; F04B 17/03; F04B 23/025; F04B 7/0076; F04B 53/02; F04B 53/164; F16D 2200/0013; F16D 2250/0007; F16D 2121/24; F16D 2125/06; F16D 2125/40; F16D 2125/50; F16H 25/20; F16H 25/2204; F16H 2025/2087; F16H 57/02
USPC .......................................................... 303/10
See application file for complete search history.

(56) References Cited

U.S. PATENT DOCUMENTS

| | | | |
|---|---|---|---|
| 2017/0030445 A1* | 2/2017 | Weh | F15B 15/14 |
| 2017/0137005 A1* | 5/2017 | Weh | F04B 23/025 |
| 2018/0345934 A1* | 12/2018 | Weh | B60T 8/4018 |

FOREIGN PATENT DOCUMENTS

| | | | | |
|---|---|---|---|---|
| CN | 201487065 U | 5/2010 | | |
| CN | 103459217 A | 12/2013 | | |
| CN | 104955696 A | 9/2015 | | |
| CN | 106458018 A | 2/2017 | | |
| CN | 107206873 A | 9/2017 | | |
| CN | 207377794 U | 5/2018 | | |
| DE | 102012223059 A1 | 6/2014 | | |
| DE | 102014212417 A1 | 12/2015 | | |
| DE | 102017214859 A1 * | 2/2019 | ............ | B60T 13/745 |
| WO | 2013023953 A1 | 2/2013 | | |
| WO | 2017089007 A1 | 6/2017 | | |
| WO | 2018099636 A1 | 6/2018 | | |

\* cited by examiner

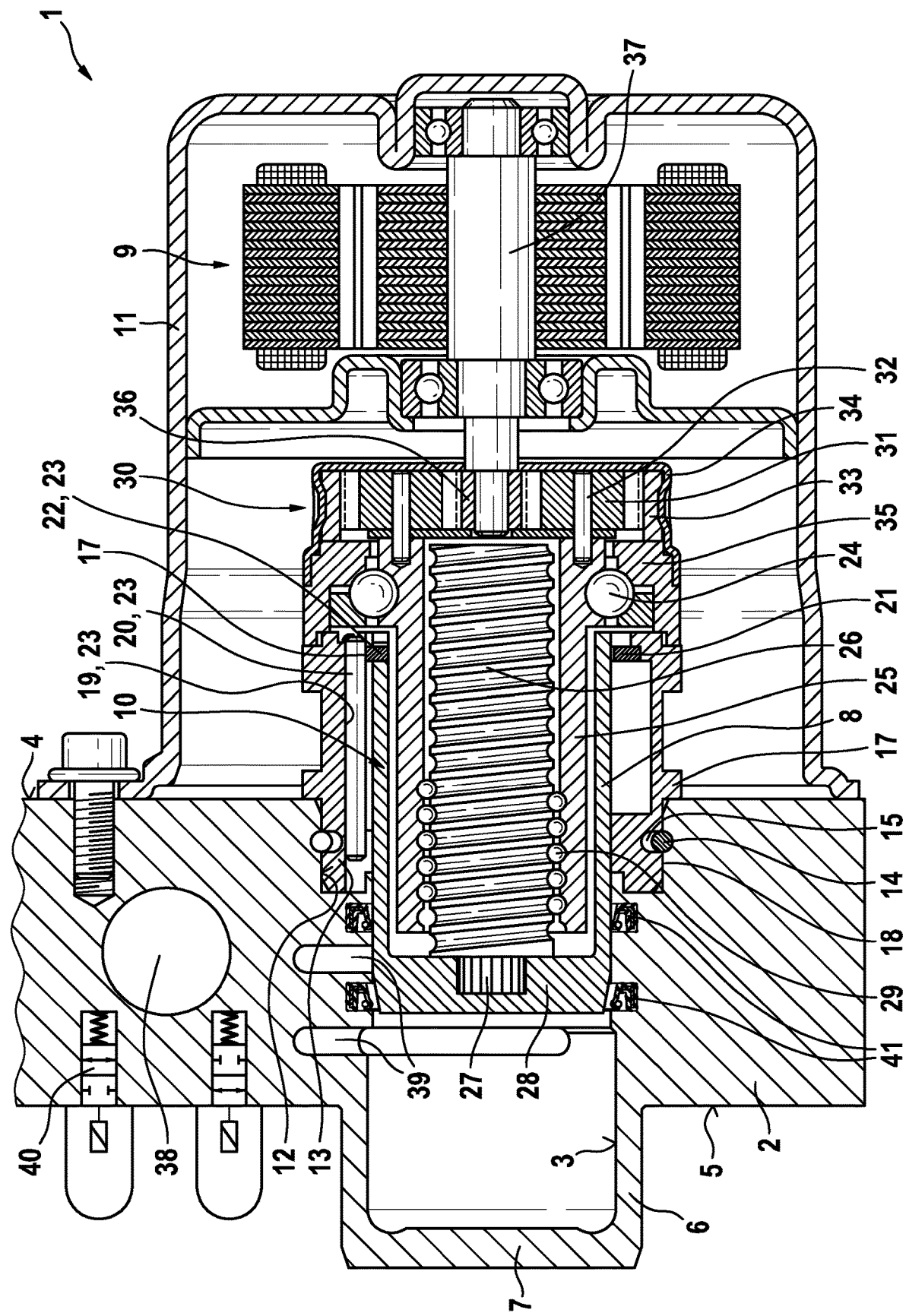

HYDRAULIC POWER UNIT FOR A HYDRAULIC VEHICLE BRAKING SYSTEM

FIELD

The present invention relates to a hydraulic power unit for a hydraulic vehicle braking system. The hydraulic power unit is provided for a brake pressure build-up and/or for the delivery of brake fluid for a slip control and/or for a brake pressure build-up for a power brake application. Slip controllers are anti-lock braking, traction control and/or vehicle dynamics control systems/electronic stability programs, for which the abbreviations ABS, TCS and/or VDC/ESP are common. Vehicle dynamics control systems/electronic stability programs are also colloquially referred to as anti-skid control systems. Slip controllers are conventional and are not discussed herein.

BACKGROUND INFORMATION

PCT Application No. WO 2013/023 953 A1 describes a hydraulic power unit including a cuboidal hydraulic block, which includes a continuous cylinder bore extending from a base side to a cover side. The base side and the cover side are the two large sides of the hydraulic block situated opposite one another. A cylinder liner, which protrudes from the hydraulic block on one side and is closed on this side, is accommodated in the cylinder bore. A piston is axially displaceably guided in the cylinder liner. An electric motor is attached coaxial to the cylinder bore and to the cylinder liner at the side of the hydraulic block situated opposite the side from which the cylinder liner protrudes, by which the piston is axially displaceable in the cylinder liner with the aid of a worm gear, which is situated coaxially between the electric motor and the piston.

By displacing the piston in the cylinder liner, a brake pressure may be built up in the cylinder liner and/or brake fluid may be delivered. Using solenoid valves, which are situated at or in the hydraulic block, it is possible to regulate the brake pressure and/or it is possible to regulate wheel brake pressures in hydraulic wheel brakes, which are connected via brake lines to the hydraulic block, for slip control.

SUMMARY

A hydraulic power unit according to an example embodiment the present invention is provided for a brake pressure build-up for a power brake application and/or for a brake pressure build-up and/or for the delivery of brake fluid for a slip control. The hydraulic power unit may be part of a hydraulic muscle power or auxiliary force vehicle braking system, in which the hydraulic power unit is used for slip control, or part of a hydraulic power vehicle braking system, in which the hydraulic power unit is used for a brake pressure build-up for a power brake application, and preferably also for a brake pressure build-up and for the delivery of brake fluid for a slip control.

The hydraulic power unit according to example embodiment of the present invention includes an, in particular, cuboidal hydraulic block made up of, in particular, metal, for example made up of an aluminum alloy. The hydraulic block is used for a mechanical attachment and hydraulic interconnection of hydraulic and other components of the vehicle braking system, such as solenoid valves, check valves, hydraulic accumulators and/or damper chambers. "Hydraulic interconnection" means a hydraulic connection of the hydraulic components corresponding to a hydraulic diagram of the vehicle braking system. The hydraulic components are used for the brake pressure regulation, "regulation" here including a control.

The hydraulic block of the hydraulic power unit according to the present invention includes a cylinder bore in which a piston is directly axially displaceably guided. "Directly" means without a cylinder liner or the like, which is situated in the cylinder bore and in which the piston is axially displaceably guided.

The hydraulic block includes an electric motor and a worm gear, which converts a rotary motion of the electric motor into a displacement, so that the piston is axially displaceable by the electric motor via the worm gear in the cylinder bore of the hydraulic block.

Refinements and advantageous embodiments of the present invention are described herein.

All features described herein and shown in the FIGURE may be implemented in specific embodiments of the present invention either alone or in a generally arbitrary combination. Embodiments of the present invention which do not include all, but only one or multiple features disclosed herein are generally possible.

The present invention is described in greater detail hereafter based on one specific example embodiment of the present invention shown in the FIGURE.

BRIEF DESCRIPTION OF THE DRAWING

The single FIGURE shows a longitudinal section axially through a cylinder bore of a hydraulic block according to an example embodiment the present invention.

DETAILED DESCRIPTION OF EXAMPLE EMBODIMENTS

The hydraulic power unit 1 according to an example embodiment of the present invention shown in the FIGURE is provided for a pressure generation in a hydraulic power vehicle braking system and/or for the pressure generation and for a delivery of brake fluid in a slip-controlled hydraulic vehicle braking system during a slip control. Such slip controllers are, for example, anti-lock braking, traction control and/or vehicle dynamics control systems/electronic stability programs, for which the abbreviations ABS, TCS and VDC/ESP are common.

Hydraulic power unit 1 according to the present invention includes a hydraulic block 2 for a mechanical attachment and hydraulic interconnection of hydraulic and other components of the slip controller, such as solenoid valves, check valves, hydraulic accumulators and damper chambers. The components are situated at and in hydraulic block 1 and hydraulically connected to one another by a bore of hydraulic block 2, which is not shown, corresponding to a hydraulic diagram of the power vehicle braking system and the slip controller.

In the illustrated and described specific embodiment of the present invention, hydraulic block 2 is a cuboidal, flat metal block made up of, for example, an aluminum alloy, which is provided with bores for accommodating the components and has bores corresponding to the hydraulic diagram of the vehicle braking system and the slip controller.

Hydraulic block 2 includes a cylinder bore 3 in the form of a through-hole perpendicular through two large, mutually opposing sides of the hydraulic block, whose one side may be referred to as motor side 4 here, and whose other side may be referred to as valve side 5.

In the illustrated and described specific embodiment of the present invention, cylinder bore 3 is open on motor side 4, and is closed on a front face situated opposite motor side 4. A cylinder 6 enclosing cylinder bore 3 is a one-piece integral component of hydraulic block 2 and, on valve side 5, protrudes over valve side 5 of hydraulic block 2. An end wall 7 of cylinder 6, which is a one-piece integral component of cylinder 6, and thus a wall of hydraulic block 2, closes cylinder bore 3 on the front face situated opposite motor side 4. An inner circumferential surface of cylinder 6 and an inner side of end wall 7 of cylinder 6 delimit and form cylinder bore 3.

A piston 8 is axially displaceably accommodated in cylinder bore 3. Piston 8 is guided directly in cylinder bore 3 of hydraulic block 2, i.e., without a liner or the like situated between cylinder bore 3 and piston 8.

Piston 8 is sealed with the aid of two piston seals 41 in cylinder bore 3 of hydraulic block 2. One of the two piston seals 41 separates a pressure connection of cylinder bore 3, in which the brake pressure may prevail, from a depressurized suction connection, in which maximally ambient pressure prevails. The other piston seal 41 seals cylinder bore 3 with respect to an electric motor 9 still to be described and a worm gear 10 for displacing piston 8 in cylinder bore 3. In the illustrated and described specific embodiment of the present invention, piston seals 41 are lip seals; however, other seals such as O-rings or quad rings are also possible (not shown). In principle, the sealing of piston 8 in cylinder bore 3 is possible using only one piston seal 41. Piston seals 41 are situated in circumferential grooves, surrounding piston 8, in a wall of cylinder bore 3 in hydraulic block 2. It is also possible for piston seals 41 to be situated in circumferential grooves on the outside in the circumference of piston 8 (not shown).

For the displacement of piston 8 in cylinder bore 3, hydraulic power unit 1 includes electric motor 9 which is attached coaxial to cylinder bore 3 at motor side 4 of hydraulic block 2. Worm gear 10 is situated between electric motor 9 and piston 8 a worm gear 10 is also coaxial to cylinder bore 3, which projects into piston 8 designed as a hollow piston and into a housing 11 of electric motor 9. In the described and illustrated specific embodiment of the present invention, worm gear 10 is a ball screw, however this is not mandatory for the present invention. Worm gear 10 converts a rotating driving motion of electric motor 9 into a displacement, by which piston 8 is axially displaced in cylinder bore 3 of hydraulic block 2. As a result of the displacement of piston 8 in cylinder bore 3, a brake pressure for an actuation of not shown hydraulic wheel brakes is built up, which are connected, or will be connected, to hydraulic block 2 via brake lines, and brake fluid is delivered during a slip control in vehicle braking system.

At an opening on motor side 4, cylinder bore 3 includes a diameter step 12 in which a cylinder tube-shaped bushing 13 is accommodated. Bushing 13 is open at both front faces and coaxial to cylinder bore 3. Its inside diameter is greater than an inside diameter of cylinder bore 3, and bushing 13 protrudes from cylinder bore 3 on motor side 4.

Bushing 13 is axially attached, with the aid of an axially resilient spring washer 14, at hydraulic block 2, which engages in a circumferential groove 15 on the outside of the bushing, and a circumferential groove 16 on the inside of cylinder bore 3 between its diameter step 12 and motor side 4 of hydraulic block 2.

A circumferential flange 17 on the outside of bushing 13 rests against hydraulic block 2 on motor side 4. Flange 17 forms an axial stop which delimits a depth by which bushing 13 projects into cylinder bore 3.

Between flange 17 and a front face situated in cylinder bore 3, bushing 13 on its outside includes an anti-rotation profile 18, which holds bushing 13 rotatably fixedly in cylinder bore 3 of hydraulic block 2 by form fit. In the illustrated and described specific embodiment, bushing 13 includes a parallel knurl as anti-rotation profile 18, which becomes integrally formed into a wall of cylinder bore 3 when bushing 13 is pressed in, and thereby holds it in a rotatably fixed manner. Another option of an anti-rotation profile 18 is, for example, a multi-tooth profile which engages a complementary counter profile in the opening of cylinder bore 3 (not shown).

At its inner circumference, bushing 13 includes axially parallel grooves 19 having a semicircular cross-section in which cylinder pins 20 rest. At a front face facing electric motor 9, an anti-rotation ring 21 is placed onto piston 8, which includes radially inwardly projecting protuberances 22, which engage in complementary recesses in the front face of piston 8, and rotatably fixedly hold anti-rotation ring 21 on piston 8. On the outside, anti-rotation ring 21 includes semicircular recesses in which cylinder pins 20 rest. In this way, anti-rotation ring 21 and piston 8 rotatably fixed thereto are held axially displaceably and rotatably fixedly in bushing 13. Cylinder pins 20, resting in an axially parallel manner in grooves 19 of bushing 13, and anti-rotation ring 21 form an anti-rotation mechanism 23 of piston 8. In the illustrated and described specific embodiment of the present invention, three cylinder pins 20 are situated evenly distributed over a circumference in axially parallel grooves 19 of bushing 13. Cylinder pins 20 may also be unevenly distributed over the circumference and/or bushing 13 may include fewer or more than three cylinder pins 20. Other anti-rotation mechanism of piston 8 in bushing 13 are possible (not shown).

At the front face facing electric motor 9, bushing 13 includes a pivot bearing 24 for a tubular nut 25 of worm gear 10 designed as a ball screw. Pivot bearing 24 is connected to bushing 13 in an axially fixed, and preferably also rotatably fixed, manner by welding or in another manner. In the illustrated and described specific embodiment of the present invention, pivot bearing 24 is a ball bearing, i.e., an antifriction bearing. However, another antifriction bearing or sliding bearing (not shown) is also possible. Nut 25 is situated in a space-saving manner largely inside piston 8, implemented as a hollow piston, and protrudes from piston 8 by only slightly more than an axial thickness of pivot bearing 24 at the front face facing electric motor 9.

A spindle 26 of worm gear 10, implemented as a ball screw, is situated coaxially in nut 25. At an end situated further away from electric motor 9, spindle 26 includes a coaxial stud 27 including a parallel knurl, which is pressed into a cylindrical counterbore in a head 28 of piston 8 implemented as a hollow piston, so that spindle 26 is axially fixed and rotatably fixed to piston 8. Via anti-rotation mechanism 23 of piston 8, spindle 26 is also rotatably fixed.

Balls 29 of worm gear 10, implemented as a ball screw, are accommodated in helical grooves on the outside in spindle 26 and on the inside in nut 25. During a rotation of nut 25, balls 29 roll in the helical grooves of nut 25 and spindle 26, and effectuate an axial movement of spindle 26, together with piston 8. Pivot bearing 24 attached to bushing 13 axially supports nut 25 of worm gear 10 and, via worm gear 10, supports piston 8 against a brake pressure prevailing in cylinder 6.

A planetary gear 30 is situated as a mechanical reduction gear between electric motor 9 and worm gear 10. Planet wheels 31 of planetary gear 30 are rotatably mounted on pins 32, which protrude from a front face of nut 25 facing electric motor 9, which, as a result, at the same time also forms a planet carrier of planetary gear 30. An annular gear 33 of planetary gear 30 is attached with the aid of a cup-shaped holder 34 at an outer ring 35 of pivot bearing 24. A sun wheel 36 of planetary gear 30 is rotatably fixedly shrunk onto a motor shaft 37 of electric motor 9.

In the illustrated and described specific embodiment of the present invention, hydraulic block 2 includes a master brake cylinder bore 38, in which a not shown master brake cylinder piston is situatable, which is mechanically displaceable via a piston rod with the aid of a foot brake pedal, which is not shown, or a hand brake lever in master brake cylinder bore 38.

Cylinder connection lines 39 implemented as bores in hydraulic block 2, for feeding brake fluid into cylinder bore 3 and for displacing brake fluid out of cylinder bore 3 with the aid of piston 8, open directly on a circumference in cylinder bore 3.

In the FIGURE, solenoid valves 40 situated at or in valve side 5 are illustrated as circuit symbols, which are used for regulating or controlling the brake pressure or wheel brake pressures in the wheel brakes. Equipped with the components of the slip controller, hydraulic block 2 forms hydraulic power unit 1.

What is claimed is:

1. A hydraulic power unit for a hydraulic vehicle braking system, the hydraulic power unit comprising:
   an electric motor;
   a one-piece hydraulic block that:
      at a side of the hydraulic block facing away from the electric motor, has (a) a first external surface and (b) a protruding region that protrudes from the first external surface in a direction away from the electric motor, the region having a second external surface that is more distal from the electric motor than the first external surface; and
      is bored with a plurality of bores, the plurality of bores including a cylinder bore forming an interior bore wall of the hydraulic block that extends into the protruding region beyond the first external surface in the direction away from the electric motor; and
   a worm gear that is rotatably driveable by the electric motor to convert a rotary motion of the electric motor into an axial displacement of the piston in the cylinder bore with at least a part of an exterior of the piston directly facing part of the interior bore wall of the hydraulic block without any intervening component positioned between the at least the part of the exterior of the piston and the part of the interior bore wall of the hydraulic block.

2. The hydraulic power unit as recited in claim 1, further comprising a piston seal that seals between the piston and the cylinder bore.

3. The hydraulic power unit as recited in claim 1, wherein a front face of the cylinder bore, which faces away from the electric motor, is closed by a wall of the hydraulic block.

4. The hydraulic power unit as recited in claim 1, further comprising a bushing, two opposite end faces of which are open, wherein:
   the bushing is situated at a motor side of the hydraulic block;
   one of the open end faces of the bushing opens into the cylinder bore; and
   the bushing is arranged coaxially to the cylinder bore.

5. The hydraulic power unit as recited in claim 4, wherein the bushing is rotatably fixed at the hydraulic block and includes an anti-rotation mechanism for the piston.

6. The hydraulic power unit as recited in claim 5, wherein the anti-rotation mechanism of the bushing includes a pin that rests in an axial groove of the bushing and that holds the piston rotatably fixedly in the bushing by form fit.

7. The hydraulic power unit as recited in claim 5, wherein the bushing protrudes into the cylinder bore of the hydraulic block and includes an anti-rotation profile on its outside which effectuates a form fit against a rotation of the bushing with respect to the hydraulic block in the cylinder bore of the hydraulic block.

8. The hydraulic power unit as recited in claim 4, wherein the bushing is axially fixed at the hydraulic block, and the bushing includes a pivot bearing that axially fixes the worm gear.

9. The hydraulic power unit as recited in claim 4, further comprising a radially resilient spring washer that axially fixes the bushing at the hydraulic block and that engages in an exterior circumferential groove of the bushing and in a circumferential groove of the cylinder bore, wherein the bushing includes a pivot bearing that axially fixes the worm gear.

10. The hydraulic power unit as recited in claim 4, wherein the bushing includes an outwardly projecting axial stop that rests against the motor side of the hydraulic block.

11. A hydraulic power unit for a hydraulic vehicle braking system, the hydraulic power unit comprising:
   an electric motor;
   a hydraulic block that:
      at a side of the hydraulic block facing away from the electric motor, has (a) a first external surface and (b) a protruding region that protrudes from the first external surface in a direction away from the electric motor, the region having a second external surface that is more distal from the electric motor than the first external surface; and
      includes a cylinder formed by a cylinder bore (a) that extends into the protruding region beyond the first external surface in the direction away from the electric and (b) that is a one-piece integral part of the hydraulic block; and
   a worm gear that is rotatably driveable by the electric motor to convert a rotary motion of the electric motor into an axial displacement of a piston in the cylinder bore.

12. The hydraulic power unit as recited in claim 1, wherein cylinder connection lines extending in the hydraulic block open directly into the cylinder bore in the hydraulic block.

13. The hydraulic power unit as recited in claim 1, wherein the cylinder bore is a one-piece integral part of the hydraulic block.

14. A hydraulic power unit for a hydraulic vehicle braking system, the hydraulic power unit comprising:
   a hydraulic block which includes a cylinder bore;
   an electric motor;
   a worm gear that is rotatably driveable by the electric motor to convert a rotary motion of the electric motor into an axial displacement of the piston in the cylinder bore; and
   a bushing that is arranged coaxially to the cylinder bore; wherein:
      two opposite end faces of the bushing are open end faces;

one of the open end faces opens into the cylinder bore; and the hydraulic power unit includes at least one of the following features (I)-(III):
- (I) the bushing is rotatably fixed at the hydraulic block and includes an anti-rotation mechanism for the piston, and the hydraulic power unit further includes at least one of the following features (a)-(b):
  - (a) the anti-rotation mechanism includes a pin that rests in an axial groove of the bushing and that holds the piston rotatably fixedly in the bushing by form fit; and
  - (b) the bushing protrudes into the cylinder bore of the hydraulic block and includes an anti-rotation profile on its outside which effectuates a form fit against a rotation of the bushing with respect to the hydraulic block in the cylinder bore of the hydraulic block;
- (II) the hydraulic power unit further comprises a radially resilient spring washer that axially fixes the bushing at the hydraulic block and engages in an exterior circumferential groove of the bushing and in a circumferential groove of the cylinder bore, and the bushing includes a pivot bearing that axially fixes the worm gear; and
- (III) the bushing includes an outwardly projecting axial stop that rests against a motor side of the hydraulic block.

15. The hydraulic power unit as recited in claim 14, wherein:
   the bushing is rotatably fixed at the hydraulic block and includes the anti-rotation mechanism for the piston; and
   the anti-rotation mechanism includes the pin that rests in the axial groove of the bushing and that holds the piston rotatably fixedly in the bushing by form fit.

16. The hydraulic power unit as recited in claim 14, wherein the bushing:
   is rotatably fixed at the hydraulic block;
   protrudes into the cylinder bore of the hydraulic block; and
   includes (a) the anti-rotation mechanism for the piston and (b) the anti-rotation profile on its outside which effectuates the form fit against the rotation of the bushing with respect to the hydraulic block in the cylinder bore of the hydraulic block.

17. The hydraulic power unit as recited in claim 14, wherein:
   the hydraulic power unit comprises the radially resilient spring washer that axially fixes the bushing at the hydraulic block and engages in the exterior circumferential groove of the bushing and in the circumferential groove of the cylinder bore; and
   the bushing includes the pivot bearing that axially fixes the worm gear.

18. The hydraulic power unit as recited in claim 14, wherein the bushing includes the outwardly projecting axial stop that rests against the motor side of the hydraulic block.

\* \* \* \* \*